United States Patent
Keller et al.

(10) Patent No.: US 7,576,168 B2
(45) Date of Patent: Aug. 18, 2009

(54) THERMOSET MATERIAL MADE FROM SILOXANE-ACETYLENE POLYMER CONTAINING METAL-ACETYLENE COMPLEX

(75) Inventors: Teddy M. Keller, Fairfax Station, VA (US); Manoj Kolel-Veetil, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 188 days.

(21) Appl. No.: 11/239,448

(22) Filed: Sep. 27, 2005

(65) Prior Publication Data

US 2007/0073027 A1    Mar. 29, 2007

(51) Int. Cl.
C08G 77/398 (2006.01)
C08G 79/00 (2006.01)
C08G 79/08 (2006.01)

(52) U.S. Cl. .................. 528/25; 528/394; 528/395

(58) Field of Classification Search ............... 528/394, 528/395, 25
See application file for complete search history.

(56) References Cited

U.S. PATENT DOCUMENTS

| | | | |
|---|---|---|---|
| 4,835,230 A * | 5/1989 | Khasat et al. ............... 526/221 |
| 4,906,710 A * | 3/1990 | Burns et al. ................. 525/474 |
| 5,272,237 A | 12/1993 | Keller et al. |
| 5,292,779 A | 3/1994 | Keller et al. |
| 5,348,917 A | 9/1994 | Keller et al. |
| 5,483,017 A | 1/1996 | Keller et al. |
| 5,552,505 A | 9/1996 | Keller |
| 5,563,181 A | 10/1996 | Keller et al. |
| 5,635,250 A * | 6/1997 | Blum et al. ................. 427/387 |
| 5,679,818 A | 10/1997 | Bucca et al. |
| 5,681,870 A | 10/1997 | Keller et al. |
| 5,756,629 A | 5/1998 | Keller et al. |
| 5,780,569 A | 7/1998 | Keller et al. |
| 5,807,953 A | 9/1998 | Bucca et al. |
| 5,844,052 A | 12/1998 | Keller et al. |
| 5,874,514 A | 2/1999 | Keller et al. |
| 5,932,335 A | 8/1999 | Keller et al. |
| 5,958,324 A * | 9/1999 | Bujalski et al. ............. 264/470 |
| 5,969,072 A | 10/1999 | Keller et al. |

(Continued)

OTHER PUBLICATIONS

Haussler et al. J. Phys. Chem. B 2004, 108, 10645-10650 and Supporting Information.*

(Continued)

Primary Examiner—Randy Gulakowski
Assistant Examiner—Robert Loewe
(74) Attorney, Agent, or Firm—John J. Karasek; Joseph T. Grunkemeyer (57) ABSTRACT

A metallized thermoset containing a crosslinked metallized polymer having a backbone having an acetylenic repeat unit and —SiR$_2$—(O—SiR$_2$)$_n$— and/or —SiR$_2$—(O—SiR$_2$)$_n$-[Cb-SiR$_2$—(O—SiR$_2$)$_n$]$_m$—. At least one of the acetylenic repeat units contains a (ML$_x$)$_y$-acetylene complex. The metallized thermoset contains a crosslink between acetylene groups and/or a polycarbosiloxane crosslink. M is a metal, L is a ligand, x and y are positive integers, R is an organic group, Cb is a carborane, and n and m are greater than or equal to zero. A method of making a metallized thermoset by providing a metallized polymer and heating the metallized polymer. The metallized polymer contains the above backbone. Heating the metallized polymer forms crosslinks between acetylene groups and/or polycarbosiloxane crosslinks.

38 Claims, 2 Drawing Sheets

U.S. PATENT DOCUMENTS

| | | | |
|---|---|---|---|
| 5,981,678 | A | 11/1999 | Keller et al. |
| 5,986,032 | A | 11/1999 | Keller et al. |
| 6,025,453 | A | 2/2000 | Keller et al. |
| 6,103,178 | A * | 8/2000 | Bujalski et al. ............. 264/470 |
| 6,187,703 | B1 | 2/2001 | Keller et al. |
| 6,225,247 | B1 | 5/2001 | Keller et al. |
| 6,265,336 | B1 | 7/2001 | Keller et al. |
| 6,362,289 | B1 | 3/2002 | Keller et al. |
| 6,495,483 | B1 | 12/2002 | Keller et al. |
| 6,579,955 | B2 | 6/2003 | Keller et al. |
| 6,759,502 | B1 * | 7/2004 | Tang et al. ..................... 528/9 |
| 6,767,981 | B1 | 7/2004 | Keller et al. |
| 6,770,583 | B2 | 8/2004 | Keller |
| 6,784,259 | B2 | 8/2004 | Keller et al. |
| 6,784,270 | B1 | 8/2004 | Keller et al. |
| 6,787,615 | B2 | 9/2004 | Keller et al. |
| 6,846,345 | B1 * | 1/2005 | Keller et al. .................. 75/255 |
| 2003/0108477 | A1 * | 6/2003 | Keller et al. ............. 423/447.1 |
| 2005/0148750 | A1 | 7/2005 | Keller |
| 2005/0171316 | A1 | 8/2005 | Keller et al. |
| 2005/0171317 | A1 | 8/2005 | Keller et al. |
| 2006/0199928 | A1 * | 9/2006 | Tang et al. ................. 526/285 |

OTHER PUBLICATIONS

Berenbaum et al. Adv. Mater. 2003, 15, 51-55.*

Hamilton et al. Chem. Commun. 1998, 1749-1750.*

Corriu et al., Journal of Organometallic Chemistry, 1996, 509, 249-257.*

Corriu et al., "Organosilicon Polymers: Pyrolysis Chemistry of Poly[(dimethylsilylene)diacetylene]," *Organometallics*, 11(7), 2507 (1992).

Corriu et al., "Pyrolysis of poly[(silylene) diacetylenes]: direct evidence between their morphology and thermal behavior," *J. Organomet. Chem.*, 449(1-2), 111 (1993).

Henderson et al., "Synthesis and Characterization of Poly(carborane-siloxane-acetylene)," *Macromolecules*, 27(6), 1660 (1994).

Hor et al., "Substituted Metal-Carbonyls Part. XVII. Thermal Decarbonylation and Chelation of $M(CO)_5(\eta$-dppf) and $Fe(CO)_4(\eta$-dppf) [where M = Cr, Mo, W; dppf = $(Ph_2PC_5H_4)_2Fe$]," *Thermochimica Acta*, 178, 287 (1991).

Houser et al., "Linear Ferrocenylene-Siloxyl-Diacetylene Polymers and Their Conversion to Ceramics with High Thermal and Oxidative Stabilities," *Macromolecules*, 31(12), 4038 (1998).

Klinger et al., "Synthesis, reactivity, and molecular structure of cyclopentadienylmolybdenum dicarbonyl dimer. Molybdenum-molybdenum triple bond," *J. Am. Chem., Soc.*, 97(12), 3535 (1975).

Lindsell et al., "Synthesis and characterization of cobalt and molybdenum complexes derived from linear conjugated diynes, triynedienes and tetraynetrienes," *J. Organomet. Chem.*, 439(2), 201 (1992).

Masuda et al., "Polymerization of phenylacetylene induced by UV. Irradiation of group 6 transition metal carbonyls," *Polymer*, 23(11), 1663 (1982).

* cited by examiner

THERMOSET MATERIAL MADE FROM SILOXANE-ACETYLENE POLYMER CONTAINING METAL-ACETYLENE COMPLEX

U.S. Nonprovisional patent application Ser. Nos. 11/239,452 and 11/239,454 are incorporated by reference.

BACKGROUND OF THE INVENTION

1. Field of the Invention

The invention generally relates to thermoset materials.

2. Description of Related Art

Most transition metal-based polymers reported to date do not contain units for conversion to a thermoset and thus afford low char yields at elevated temperatures. Carboranylenesiloxanes are highly sought after high temperature, thermally and thermo-oxidatively stable polymers (Dvornic et al., *High temperature Siloxane Elastomers*; Huthig & Wepf: Heidelberg, Germany (1990)). These materials are desirable, especially when it comes to their thermo-oxidative stabilities at very high temperatures. The introduction of unsaturated cross-linkable units such as a diacetylene unit in such materials resulted in the production of extended polymer networks of carboranylenesiloxanes (Henderson et al., "Synthesis and Characterization of Poly(carborane-siloxane-acetylene)," *Macromolecules*, 27(6), 1660 (1994)).

SUMMARY OF THE INVENTION

The invention comprises a metallized thermoset comprising a crosslinked metallized polymer comprising a backbone comprising: an acetylenic repeat unit and one or more repeat units selected from —$SiR_2$—(O—$SiR_2$)$_n$— and —$SiR_2$—(O—$SiR_2$)$_n$-[Cb-$SiR_2$—(O—$SiR_2$)$_n$]$_m$—. At least one of the acetylenic repeat units comprises a $(ML_x)_y$-acetylene complex. The metallized thermoset comprises one or more of a crosslink between acetylene groups and a polycarbosiloxane crosslink. Each M is an independently selected metal, each L is an independently selected ligand, each x and each y are positive integers, each R is an independently selected organic group, each Cb is an independently selected carborane, and each n and each m is an independently selected integer greater than or equal to zero.

The invention further comprises a composition comprising a siloxane thermoset and a metallic compound. The siloxane thermoset comprises the a backbone comprising an acetylene group and one or more repeat units selected from —$SiR_2$—(O—$SiR_2$)$_n$— and —$SiR_2$—(O—$SiR_2$)$_n$-[Cb-$SiR_2$—(O—$SiR_2$)$_n$]$_m$—. The siloxane thermoset comprises one or more of crosslinks between acetylene groups and polycarbosiloxane crosslinks. The metallic compound is capable of reacting with the acetylene group to form a $(ML_x)_y$-acetylene complex. M, L, x, y, R, Cb, n, and m are as defined above.

The invention further comprises a composition comprising the above siloxane thermoset and one or more metallic components dispersed homogeneously throughout the composition, the metallic component selected from free metal atoms, metal clusters, metal nanoparticles, organometallic compounds, organometallic units, and metal salts.

The invention further comprises a method of making a metallized thermoset comprising providing a metallized polymer and heating the metallized polymer. The metallized polymer comprises a backbone comprising an acetylenic repeat unit, at least one of the acetylenic repeat units comprising a $(ML_x)_y$-acetylene complex and one or more repeat units selected from —$SiR_2$—(O—$SiR_2$)$_n$— and —$SiR_2$—(O—$SiR_2$)$_n$-[Cb-$SiR_2$—(O—$SiR_2$)$_n$]$_m$—. Heating the metallized polymer forms one or more crosslinks selected from a crosslink between acetylene groups and polycarbosiloxane crosslink. M, L, x, y, R, Cb, n, and m are as defined above.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The incorporation of transition metals into a polymer structure may be used to prepare materials with different properties from conventional carbon-based polymers. In general, the rich diversity of coordination numbers and geometries available for transition elements offer the possibility of accessing polymers with unusual conformational, mechanical, and morphological characteristics. The incorporation of transition metals into polymers may be useful in the production of nanomaterials of transition metals if the polymers are thermally and thermo-oxidatively stable materials. In such polymers, their derivatives with transition metals in the main chain structure (either in the backbone or on the chain) may provide access to processable, specialty materials with similarly attractive physical properties of interest as pyrolytic precursors to metal containing polymers and ceramics.

Metal species may be incorporated in the polymer backbone of diacetylene-containing carboranylenesiloxanes (Houser et al., "Linear Ferrocenylene-Siloxyl-Diacetylene Polymers and Their Conversion to Ceramics with High Thermal and Oxidative Stabilities," *Macromolecules*, 31(12), 4038 (1998); Keller et al., U.S. Pat. No. 5,844,052). The constituent diacetylene unit, in addition to forming extended networks upon crosslinking, can function as a vehicle for metal incorporation prior to cross-linking as it can form adducts with various metal species. For example, alkynes in general can add across the metal-metal triple bond in $Cp_2Mo_2(CO)_6$ to form adducts of the type $Cp_2Mo_2(CO)_6(\mu\text{-}\eta^2\text{:}\eta^2\text{-}R\text{—}C\text{=}C\text{—}R)$ with a tetrahedral $C_2Mo_2$ core (Eq. (1)) (Klinger et al., "Synthesis, reactivity, and molecular structure of cyclopentadienylmolybdenum dicarbonyl dimer. Molybdenum-molybdenum triple bond," *J. Am. Chem. Soc.*, 97(12), 3535 (1975)). In fact, under photochemical conditions, some metal complexes are even known to function as catalysts for the crosslinking of acetylenes (Masuda et al., "Polymerization of phenylacetylene induced by UV. Irradiation of group 6 transition metal carbonyls," *Polymer*, 23(11), 1663 (1982)).

(1)

As used herein, the term "siloxane" also includes silanes, as when n is zero. A polycarbosiloxane crosslink also refers to a polycarbosilane crosslink. The acetylenic repeat unit may be crosslinked and still be referred to as an acetylenic repeat unit. Such acetylene and polycarbosiloxane crosslinks are described by Corriu et al., "Organosilicon Polymers: Pyrolysis Chemistry of Poly[(dimethylsilylene)diacetylene]," *Organometallics*, 11(7), 2507 (1992). Polycarbosiloxane crosslinks may be found, among other possibilities, when all the acetylene groups are complexed by using an excess of metallic compound. The backbone may also comprise one or more metallic repeat units selected from metallocenylene, -M'Cp$_2$-, and -M'L'$_z$-. Each M' is a metal, Cp is cyclopentadienyl, each L' is an independently selected ligand, and each z is an integer from 2 to 6. Such metallic repeat units are shown in Eq. (2).

(2)

Such siloxane polymers and methods of making them are disclosed in U.S. Pat. Nos. 5,272,237; 5,292,779; 5,348,917; 5,483,017; 5,552,505; 5,563,181; 5,679,818; 5,681,870; 5,756,629; 5,780,569; 5,807,953; 5,844,052; 5,874,514; 5,932,335; 5,969,072; 5,981,678; 5,986,032; 6,025,453; 6,187,703; 6,225,247; 6,265,336; 6,362,289; 6,495,483; 6,579,955; 6,767,981; 6,770,583; 6,784,259; 6,784,270; 6,787,615 to Keller et al. and US Patent Application Publication Nos. 2005/0148750, 2005/0171316, and 2005/0171317 to Keller et al. Generally, such polymers may be made, among other methods, by reacting halogen-terminated units with hydroxyl-terminated units or metal-terminated units, including lithium-terminated units.

A metallized thermoset contains at least one $(ML_x)_y$-acetylene complex in the backbone and may be made by reaction of the siloxane polymer or siloxane thermoset with a suitable metallic compound followed by crosslinking if a siloxane polymer is used. THF may be used as a solvent for this reaction to facilitate the displacement of, for example, the carbonyl ligands. In most solvents, the predominant isomer is trans. In solvents such as DMSO, THF, DMF, hexanes, or mixtures of them, the ratio can be reversed. Between the trans and gauche isomers, the carbonyl exchange or displacement with the lowest energy dynamics is observed in gauche-Cp$_2$Mo$_2$(CO)$_6$. Thermosets made by crosslinking the siloxane polymer or the metallized polymer may also be used.

The acetylenic repeat unit comprises one or more acetylene groups, any of which may be $(ML_x)_y$-acetylene complex. In some embodiments, the acetylenic repeat unit is based on diacetylene. Such a repeat unit consists of two groups independently selected from acetylene and $(ML_x)_y$-acetylene complex.

Suitable metals for the M in the complex or metallic compound include, but are not limited to, main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

Suitable ligands (L group) for the complex or metallic compound include, but are not limited to, carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

Suitable Cb groups include, but are not limited to, —CB$_{10}$H$_{10}$C— (dodecacarborane). Suitable R groups include, but are not limited to, methyl. All the R groups may be methyl.

Suitable values for x include, but are not limited to, 1 to 16 or 1 to 12. Suitable values for y include, but are not limited to, 1 to 6 or 1 to 4. Suitable metallic compounds (including metal salts) include, but are not limited to, V(CO)$_6$, Cr(CO)$_6$, Mo(CO)$_6$, W(CO)$_6$, Mn$_2$(CO)$_{10}$, TC$_2$(CO)$_{10}$, Re$_2$(CO)$_{10}$, Fe(CO)$_5$, Fe$_2$(CO)$_9$, Fe$_3$(CO)$_{12}$, Ru(CO)$_5$, Ru$_3$(CO)12, Os(CO)$_5$, Os$_3$(CO)$_{12}$, Co$_2$(CO)$_8$, Co$_3$(CO)$_{12}$, Co$_6$(CO)$_{16}$, Rh$_4$(CO)$_{12}$, Rh$_6$(CO)$_{16}$, Ir$_4$(CO)$_{12}$, Ir$_6$(CO)$_{16}$, Ni(CO)$_4$, Cp(CH$_3$)$_5$Re(CO)$_3$, Cp(CH$_3$)$_5$Re(CO)$_3$, [Cp(CH$_3$)$_5$]$_2$Cr$_2$(CO)$_4$, Cp$_2$Fe$_2$(CO)$_4$, C$_6$H$_8$Fe(CO)$_3$, C$_6$H$_8$Fe(CO)$_3$, C$_8$H$_8$Fe(CO)$_3$, CpCr(CO)$_3$, Cp$_2$Mo$_2$(CO)$_6$, C$_7$H$_8$Mo(CO)$_3$, CpMn(CO)$_3$, Cp(Si(CH$_3$)$_3$)Mn(CO)$_3$, Cp(CH$_3$)$_5$Rh(CO)$_2$, Cp$_2$Ru$_2$(CO)$_4$, (hexafluroacetylacetonate)Cu(cyclooctadiene), Cr(hexafluroacetylacetonate), Co(acetylacetonate)(CH$_3$CN)$_4$ Cu(hexafluroacetylacetonate), (CH$_3$)$_2$Au(acetylacetonate), (cyclooctadiene)Ir(acetylacetonate), Fe(acetylacetonate), Mn(acetylacetonate), MoO$_2$(acetylacetonate)$_2$, Ni(hexafluroacetylacetonate), Ni(cyclooctadiene)$_2$, Ni(SCN)$_2$, PdCl$_2$(CH$_3$CN)$_2$, Pd(NH$_3$)$_2$(NO$_2$)$_2$, Pt(NH$_3$)$_2$Cl$_2$, Rh(cyclooctadiene)$_2$(SO$_3$CF$_3$), Rh(cyclooctadiene)Cl$_2$, Zr(trifluoroacetylacetonate), MgCl$_2$, SmCl$_2$, and AlCl$_2$.

Suitable metallocenylenes in the metallic repeat unit include, but are not limited to, ferrocenylene. Suitable M' groups include, but are not limited to, main group metals, transition metals, lanthanides, actinides, iron, ruthenium, osmium, molybdenum, zirconium, vanadium, tungsten, titanium, platinum, nickel, rhodium, and palladium. Suitable M' groups for metallocenylene include, but are not limited to, iron, ruthenium, osmium, molybdenum. Suitable M' groups for -M'Cp$_2$- include, but are not limited to, molybdenum, zirconium, vanadium, and tungsten. Suitable M' groups for -M'L'$_z$-, include, but are not limited to, platinum, nickel, rhodium, palladium, and ruthenium. Suitable L' groups include, but are not limited to, amino, ethylene, and cyclooctadiene.

In some embodiments, the siloxane polymer from which the thermoset may be made has the structure shown in Eq. (3). Q is the acetylenic repeat unit. Y is the metallic repeat unit. Each p is an integer greater than or equal to zero. Suitable combinations of n, m, and p include, but are not limited to, n is 1, m is 1, and p is zero (Eq. (4)); n is 1, m is zero, and p is zero (Eq. (5)); n is 1, m is 1, and p is 1 (Eq. (6)); and n is 1, m is zero, and p is 1 (Eq. (7)).

A composition may be made comprising the metallic thermoset and one or more metallic components dispersed homogeneously throughout the composition. The metallic component is selected from free metal atoms, metal clusters, metal nanoparticles, organometallic compounds, organometallic units, and metal salts. Organometallic compounds and metal salts may be, but are not limited to, reactants used to form the metallized polymer/thermoset, either unreacted or previously reacted and released during the heating. Organometallic units may be, but are not limited to, metallic repeat units in the backbone that have decomposed from the backbone. The metallic component may be generated while heating, such as when crosslinking a metallized polymer.

Another composition comprises the metallized thermoset and siloxane thermoset. This may be made when not all molecules contain a $(ML_x)_y$-acetylene complex, such as when an excess of polymer/thermoset is present.

When a composition comprising siloxane thermoset without any metallized polymer or metallized thermoset is used to make the metallized thermoset, then the composition may also comprise a metallic compound capable of reacting with the acetylene group to form a $(ML_x)_y$-acetylene complex. This allows for the formation of $(ML_x)_y$-acetylene complex during the heating process, though such formation is not required. Such a compound may also be in the composition when metallized polymer or thermoset is present. This method may also produce a composition comprising siloxane thermoset and free metal atoms, metal clusters, metal nanoparticles, organometallic compounds, organometallic units, and/or metal salts dispersed homogeneously throughout the composition.

Several processes may occur as the composition is heated. Polymers may crosslink to thermosets. Acetylene crosslinking may be catalyzed by metal components, including decomposed metal salts. Metal complexes may form with the acetylene groups. Metal complexes may decompose to release free metal atoms, which can then agglomerate into metal clusters and/or metal nanoparticles. Such clusters and nanoparticles include both pure metal and metal compounds such as $Mo_2C$. After such decomposition, the decomplexed acetylene may crosslink. Metallic repeat units may decompose from the backbone and also form organometallic units, free metal atoms, metal clusters, and/or metal nanoparticles. Polycarbosiloxane crosslinking can occur.

The reaction of a siloxane polymer or thermoset with a metal carbonyl or a neutral metal complex with labile ligands can be carried out at various ratios of the siloxane and metallic compound. The ratio can be chosen so as to retain a desired fraction of the starting inorganic-organic hybrid polymer in its unreacted and partially reacted forms in the product mixture (Eq. (8)). Such a retention is achieved to provide unreacted and partially reacted diacetylene units in the product mixture for utilization in thermoset formation by their crosslinking reactions. The reactant ratios at least partly dictate the ratio of the product components.

(8)

Figure 1A:
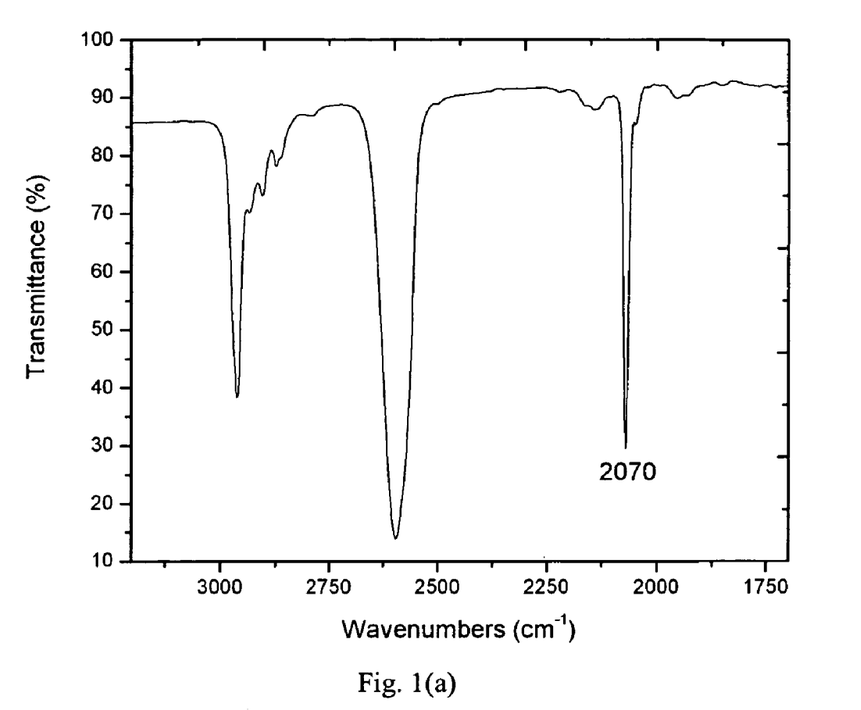
FIG. 1 shows IR spectra demonstrating the formation of a metal-acetylene complex.
Figure 1B:
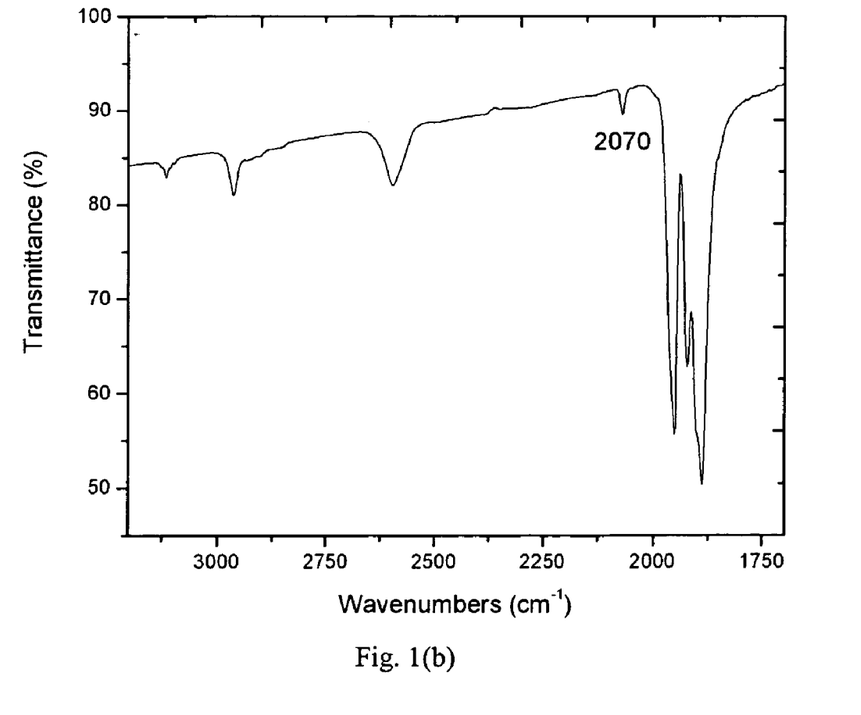

As used herein, a molar ratio of polymer to metal compound refers to the ratio of the acetylenic repeat unit (such as a diacetylene repeat unit) to metal compound. In a reaction using the siloxane polymer shown in Eq. (4) (1) performed at an equimolar ratio of acetylenic repeat units and $Cp_2Mo_2(CO)_6$, three products of the form in Eq. (8) can be formed in various amounts depending on the reaction kinetics. The evidence of the reaction and its progress may be provided by FTIR spectroscopy. The equimolar reaction of $Cp_2Mo_2(CO)_6$ with 1 in refluxing THF results in the displacement of two of the carbonyl ligands by the diacetylene, yielding the transient, reactive triply-bonded $Cp_2Mo_2(CO)_6$ and subsequently, a π-bonded complex. As the reaction progresses, the initial IR absorptions of $Cp_2Mo_2(CO)_6$ (1960 and 1915 cm$^{-1}$) (FIG. 1(a)) are replaced by new IR absorptions at 1950, 1923, 1900 and 1891 cm$^{-1}$ of the diacetylene-bound $Cp_2Mo_2(CO)_6$ moieties (FIG. 1(b)). The presence of an unchanged diacetylene absorption at 2070 cm$^{-1}$ in the FTIR spectrum of the final product suggests that a fraction of the starting material remains unreacted as expected. Since the reaction is quantitative in yield, this implies that the starting reactant $Cp_2Mo_2(CO)_6$ has to be distributed among the reacted fraction of the siloxane polymer yielding either a mono or a bis π-coordinated $\eta^5$-cyclopentadienyltetracarbonyl-dimolybdenum complex. Such a formation of π-complexes has been reported in the reaction involving $Cp_2Mo_2(CO)_6$ and the conjugated enediyne, E-1,6-bis(trimethylsilyl)hexa-1,5-diyn-3-ene (Lindsell et al., "Synthesis and characterization of cobalt and molybdenum complexes derived from linear conjugated diynenes, triynedienes and tetraynetrienes," *J. Organomet. Chem.*, 439(2), 201 (1992). Further evidence for the retention of a fraction of the siloxane polymer in its unreacted form is obtained from the product's $^{13}C$ NMR spectrum in $CDCl_3$. In the $^{13}C$ NMR spectrum, the NMR resonances of the diacetylene carbons (C1 and C2 in Eq (9)) of the siloxane at δ 87.05 and 84.81 are still evident indicating the presence of some unreacted siloxane polymer. In addition, the resonances for the carbons of the diacetylene units in the mono- and bis-$Cp_2Mo_2(CO)_6$ derivatives are observed at δ 132.46 (C4), 130.86 (C8), 128.79 (C5), 111.22 (C3), and 92.29 (C6 and C7). Unique resonances are also observed for the cyclopentadienyl groups (δ 95.72 (PR); δ 91.99 (CR)) and the carbonyl ligands (δ 241.5 (PR), 234.1 (PR), 229.8 (PR); 226.5 (CR), 223.9 (CR)) of the 7r-coordinated mono- and bis-$Cp_2Mo_2(CO)_6$ complexes. The observed $^{13}C$ resonances are well in agreement with similar reported values for the π-coordinated mono- and bis-$Cp_2Mo_2(CO)_6$ complexes formed from the reaction between $Cp_2Mo_2(CO)_6$ and the conjugated enediyne, E-1,6-bis(trimethylsilyl)hexa-1,5-diyn-3-ene (Lindsell, Id.). Together, the FTIR and FTNMR spectroscopic studies of the reaction product confirmed that free diacetylene units and acetylene fragments are available in the product for its conversion into a network system by thermal crosslinking.

(9)

The crosslinking or curing of the polymer/thermoset/metallic component composition may be achieved by the thermal treatment of the product to, for example, about 400° C. in two steps of various durations. On crosslinking, the strands of the oligomers with the partially or completely functionalized diacetylene units may be bound within a tightly crosslinked network system formed by the thermal polymerization of the diacetylene units (in unreacted polymer) and the acetylene fragments (in partially reacted PR). A tightly crosslinked network may enhance the entrapment of the reactant moieties in closer proximity during the initial stage of the pyrolysis thereby facilitating product formation.

Figure 2:
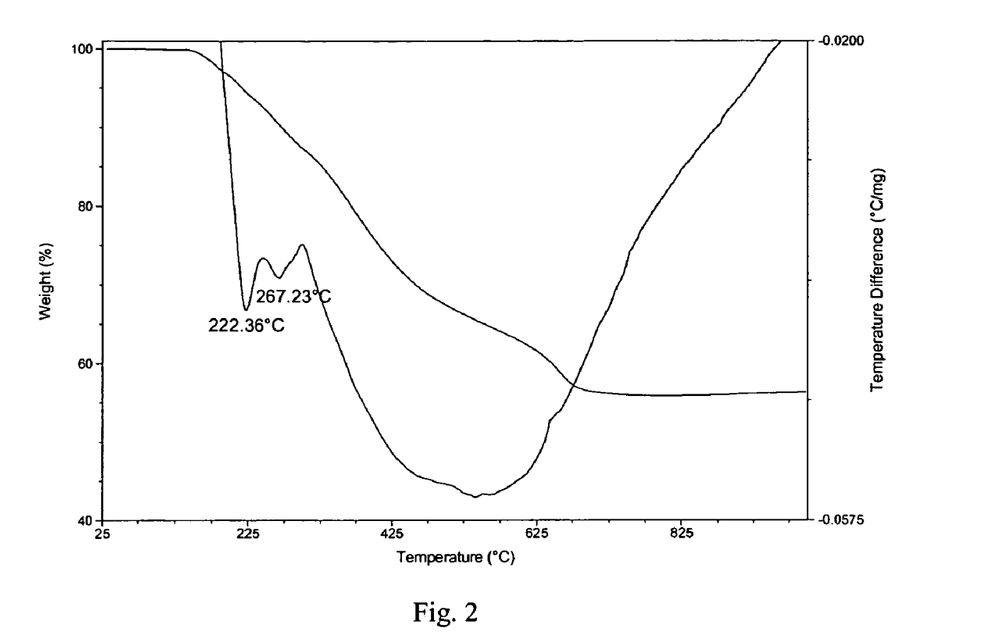
FIG. 2 shows a TGA-DTA thermogram of the adduct of 1 and $Cp_2Mo_2(CO)_6$.

Weight losses during the curing of the crosslinked network formed from the adduct of 1 and $Cp_2Mo_2(CO)_6$, were 33% and 11% at separate points. These losses corresponded roughly to the elimination of the labile carbonyl and cyclopentadienyl ligands during the initial curing process and the subsequent expulsion of the silicon-bound methyl groups during the later stages of the curing process (and during pyrolysis). The deletion of carbonyls and cyclopentadienyl rings from organometallics has been known to occur at temperatures below 300° C. (Hor et al., "Substituted Metal-Carbonyls Part. XVII. Thermal Decarbonylation and Chelation of $M(CO)_5(\eta\text{-dppf})$ and $Fe(CO)_4(\eta\text{-dppf})$ [where M=Cr, Mo, W; dppf=$(Ph_2PC_5H_4)_2Fe$]," *Thermochimica Acta*, 178, 287 (1991)). The loss of methyl groups from siloxyl units have been reported to occur in the 450-550° C. temperature range (Corriu et al., "Pyrolysis of poly[(silylene) diacetylenes]: direct evidence between their morphology and thermal behavior," *J. Organomet. Chem.*, 449(1-2), 111 (1993)). The evidence for the respective losses of ligands from the crosslinked network can be obtained from a TGA-DTA thermogram of the network by thermally treating it to 1000° C. at 10° C./min. As seen in FIG. 2, the differential curve in the thermogram exhibits two sharper peaks (transitions) around 222° C. and 267° C. and a broader peak centering at 525° C.

The sharper peaks represent the successive removal of the carbonyl and the cyclopentadienyl ligands within a narrow temperature range and the latter broad peak originates from the removal of the silicon-bound methyl groups over a large temperature range. Further evidence for the respective removal of the ligands during the crosslinking of the reaction product between 1 and $Cp_2Mo_2(CO)_6$ can also obtained from the solid state FTIR spectra (in KBr pellets) of crosslinked samples obtained by the thermal treatment of the reaction product at 300° C. (for one hour) and 550° C. (for two hours), respectively. In the FTIR spectrum of the former, the IR absorptions of the carbonyls (1950, 1923, 1900, and 1891 $cm^{-1}$) and that of the cyclopentadienyl ligands (3114 $cm^{-1}$) in the reaction product were found to be absent, while in the latter's FTIR spectrum in addition to the carbonyl and cyclopentadienyl absorptions, the absorptions for the silicon-bound methyl groups (1257, 822 $cm^{-1}$, etc.) were also absent. The organometallic derivatives of the inorganic-organic hybrid polymers of this invention essentially may rely on this initial availability of unreacted diacetylene units and the subsequent thermal curing of these units to produce tight crosslinked networks to facilitate their eventual conversion into transition metal nanomaterials by pyrolytic reactions.

Similar reactions of 1, 2, 3, or 4 at desired ratios (for example, 3:1, 1:5, etc.) with a particular metal carbonyl or a labile ligand-containing neutral metal complex can yield differing amounts of the unreacted, partially reacted and completely reacted polymers of 1, 2, 3, or 4.

The precursors and thermosets of the metal adducts of the diacetylene containing poly(siloxanes) and poly(carboranylenesiloxanes) upon thermal treatment above 500° C. can produce several magnetic, semiconducting, and superconducting nanomaterials with tunable properties and desired sizes by the simple manipulation of the processing temperature of the metal-derived products of the inorganic-organic hybrid polymers (linear and network). At a certain temperature, the metallic component of the precursor can commence to decompose in the polymer or the thermoset, resulting in the formation of metal nanoparticles within the networked system. This happens as the temperature of the composition is increased causing the solidification of the sample and the subsequent decomposition of the metallacyclic compound resulting in the formation of initially metal atoms followed by metal clusters and/or metal nanoparticles within the polymeric composition (atomization). The metal species (atoms, clusters, and nanoparticles) can be encapsulated and protected against oxidation by the developing polymeric/ceramic domain.

The size and concentration of the metal species may be readily controlled by the amounts of metal component present in the thermoset derived from the metal adduct of the polymer. For example, as the molar concentration of metal component relative to the polymer is increased, metal nanoparticles within the polymer can become strongly coupled giving rise to physical properties in the developing thermoset material resulting from the formation of magnetic nanodomains. The nature of the product derived from a reactive metal species and the concerned inorganic-organic hybrid polymers may be at least partly determined by the fashion in which the metal is incorporated into the polymeric system, i.e., as a part of the main chain (backbone) or as a pendant group.

The conducting property of the nanomaterial derived from a particular metal-derived inorganic-organic hybrid polymer as to whether it is semiconducting, conducting, or superconducting may depend on the choice of the pyrolysis temperature and the crystalline lattice produced. The size and nature of the nanoparticles can further be tailored by the selective treatment of the materials at chosen temperatures.

The thermal treatment can be carried out either in an inert (argon, $N_2$) atmosphere or in air. Even though, the metal species (atoms, clusters, and nanoparticles) are encapsulated and protected against oxidation by the developing polymeric domain, the nature of the environment can have an effect on the nature of the nanomaterials that are produced. The identity and nature of the nanomaterials that are produced can depend upon the reactant ratio of the metal complex and the polymer, the site of spatial incorporation of the metal unit in the polymer, the rate of temperature treatment and the final temperature, and the atmosphere under which the treatment is conducted.

Having described the invention, the following examples are given to illustrate specific applications of the invention. These specific examples are not intended to limit the scope of the invention described in this application.

Instrumentation—Thermogravimetric analyses (TGA) were performed on a SDT 2960 DTA-TGA analyzer under a nitrogen flow rate of 100 cc/min. The heating rate was 1° C./min, 2° C./min, or 10° C./min and the cooling rate was 5° C./min. The differential scanning calorimetry (DSC) studies were performed on a DSC 2920 modulated DSC instrument and carried out with heating rates of 10° C./min and a nitrogen flow rate of 100 cc/min. Infrared (IR) spectra were obtained on a Nicolet Magna 750 Fourier transform infrared spectrometer. Solution-state $^{13}C$ NMR spectra were acquired on a Bruker AC-300 spectrometer and referenced to the internal solvent peak (chloroform-d, or $CDCl_3$).

EXAMPLE 1

Synthesis of poly(carborane-siloxane-diacetylene), 1

The reaction was initiated in two flasks, the contents of which were later mixed to yield the product.

Flask #1: THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h.

Flask #2: A flame-dried 200 mL flask under argon was charged with 0.285 g of m-carborane (1.974 mmol). THF (1 mL) was transferred to this flask and m-carborane was dissolved in it. The reaction flask was immersed in an ice bath and 1.99 mL of a 2.0 M lithium diisopropylamide solution in THF (3.98 mmol) was added drop wise via syringe. After the addition was complete, the mixture was warmed to room temperature and stirred for 2 h. The volatiles were then removed with high vacuum and the solid residue was redissolved in THF (5 mL). The solution was then cooled with an ice bath and 0.77 mL of 1,3-dichlorotetramethyldisiloxane (3.949 mmol) was added drop wise. The ice bath was removed and the reaction was allowed to proceed for another 5 h.

The contents of flask #2 were cooled in an ice bath. The contents of flask #1 were then cannulated into flask #2. The reaction was allowed to proceed overnight. After this period, a few extra drops of the siloxane reagent were added to the mixture and the reaction was continued for two more hours. The mixture was then poured into an aqueous saturated $NH_4Cl$ solution (30 mL). The aqueous mixture was extracted with $Et_2O$ (3×20 mL). The ether extracts were then combined, dried over $Na_2SO_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H\ Si-CH3}$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 2

Synthesis of poly(siloxane-diacetylene), 2

THF (3.5 mL) and n-butyllithium (3.134 mL, 2.52 M, 7.897 mmol) were transferred to a flame-dried 50 mL flask and the mixture was cooled to −78° C. in a dry ice/2-propanol bath. While stirring, 0.309 mL of hexachlorobutadiene (1.974 mmol) was added drop wise over 15 min. After the addition, the reaction mixture was warmed to room temperature and stirred for 4 h. After this period, the reaction flask was cooled again to −78° C. and 0.39 mL of 1,3-dichlorotetramethyldisiloxane (1.975 mmol) was added drop wise. The ice bath was removed and the reaction was allowed to proceed overnight. After this period, a few extra drops of the siloxane reagent were added to the mixture and the reaction was continued for two more hours. The mixture was then poured into an aqueous saturated NH$_4$Cl solution (30 mL). The aqueous mixture was extracted with Et$_2$O (3×20 mL). The ether extracts were then combined, dried over Na$_2$SO$_4$ and the dried extracts were filtered through celite. The filtered extracts were subjected to vacuum to remove the ether, which resulted in an oily brown product (1.9 g, 100%). IR (KBr, cm$^{-1}$): 2959 ($v_{C-H}$ Si—CH$_3$), 2921 ($v_{C-H}$ Si—CH$_3$), 2597 ($v_{B-H}$), 2071 ($v_{C-C}$), 1409 ($v_{-CH2\ bend}$), 1264 ($v_{Si-C}$), 1059 ($v_{Si-O}$), 801 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 3

Synthesis of poly(carborane-siloxane-diacetylene-siloxane-ferrocene), 3

The reaction was initiated in two flasks, the contents of which were later mixed to yield the product.

Flask 1: Synthesis of Li$_2$ Cp$_2$Fe. TMEDA: A Schlenk flask, flame-dried under vacuum, was charged with 1.27 g (6.83 mmol) of ferrocene and 40 mL of hexane under argon. The resulting orange slurry was stirred at room temperature for 1 h. The solution was then treated with 2.07 mL or 1.59 g (13.66 mmol) of TMEDA via syringe. The mixture was cooled to −78° C. in a dry ice/isopropanol bath. 5.44 mL of a 2.5 M n-BuLi solution in hexanes was then added to the mixture and the solution was stirred for 18 h. An orange precipitate had formed at the end of the reaction. The precipitate was collected by filtering the mixture through a fritted funnel that was attached to another flame dried Schlenk flask by connecting the flask to the free end of the funnel followed by inversion of the flask. The precipitate was dissolved in 10 mL of THF for addition to contents of Flask 2.

Flask 2: Synthesis of (Cl-disiloxyl-carboranyl-disiloxyl-diacetylene-disiloxyl-carboranyl-disiloxyl-Cl): THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and a preformed solution of Cl-disiloxyl-carboranyl-disiloxyl-Cl (13.660 mmol) was added dropwise to it. The mixture was then stirred at room temperature for 3 h.

The mixture was again cooled to −78° C. and the THF solution of the lithiated ferrocenyl compound from Flask 1 was cannulated into it. The mixture was stirred at room temperature for 2 h, a few drops of the siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{-CH2\ bend}$), 1261 ($v_{Si-C}$), 1077 ($v_{Si-O}$), 797 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 4

Synthesis of poly(ferrocene-siloxane-diacetylene), 4

THF (10 mL) and n-butyllithium (10.2 mL, 2.50 M, 25.50 mmol) were transferred to a flame-dried 50 mL flask and the mixture was cooled to −78° C. in a dry ice/2-propanol bath. While stirring, 1.10 mL of hexachlorobutadiene (6.830 mmol) was added drop wise over 15 min. After the addition, the reaction mixture was warmed to room temperature and stirred for 3 h. After this period, the mixture was cooled to −78° C. and 2.66 mL of the dichlorotetramethyldisiloxane reagent (13.660 mmol) was added dropwise to it. The mixture was then stirred at room temperature for 3 h. The mixture was again cooled to −78° C. and a 10 mL THF solution, prepared in a separate flask, of 2.9 g of the lithiated ferrocenyl compound (6.830 mmol) was cannulated into the mixture. The mixture was stirred at room temperature for 2 h, a few drops of siloxane reagent were added, and the stirring was continued for an hour more. The mixture was then subjected to an aqueous work-up to yield the product. (1.9 g, 100%). IR (KBr, cm$^{-1}$): 3092 (Fc), 2961 ($v_{C-H}$ Si—CH$_3$), 2921 ($v_{C-H}$ Si—CH$_3$), 2599 ($v_{B-H}$), 2075 ($v_{C-C}$), 1414 ($v_{-CH2\ bend}$), 1261 ($v_{Si-C}$), 1077 ($v_{Si-O}$), 797 ($v_{Si-C\ bend}$). $^1$H NMR (CDCl$_3$, ppm): 0.008 (Si—CH$_3$), 0.120 (Si—CH$_3$), 0.180 (Si—CH$_3$), 0.210 (Si—CH$_3$), 0.270 (Si—CH$_3$), 3.25-0.72 (C—H, m-carborane). $^{13}$C{$^1$H} NMR (CDCl$_3$, ppm): 0.26 (Si—CH$_3$), 0.52 (Si—CH$_3$), 1.00 (Si—CH$_3$), 1.79 (Si—CH$_3$), 65.92 (m-C$_2$B$_{10}$H$_{10}$), 86.8 (—C—C), and 84.2 (—C—C).

EXAMPLE 5

Reaction of Co$_2$(CO)$_8$ with 1 at a ratio of Co:1=1:1

Reagents 1 (0.5 g, 1.099 mmol) and Co$_2$(CO)$_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 1 was transferred to the flask containing the Co reagent solution using a cannula.

After the addition, the solution was warmed to room temperature. The reaction was monitored by the periodic investigation of the reaction mixture by FTIR spectroscopy. It was allowed to proceed until the disappearance of the carbonyl absorptions of $Co_2(CO)_8$ (absorptions for $Co_2(CO)_8$ are 2022, 1847, and 1828 $cm^{-1}$) was achieved. (In this case, the completion of the reaction was indicated by three new carbonyl absorptions at 2097, 2062, and 2030 $cm^{-1}$ and a remnant diacetylene absorption at 2070 $cm^{-1}$ in the product's IR). The product (yield=99.5%) was collected by removing hexane under vacuum with the flask placed in an oil bath at 80° C. Yield=99.9%.

EXAMPLE 6

Thermoset formation from the reaction product in Example 5

A 0.1 g portion of the reaction product from Example 5 was taken in a ceramic crucible and was placed in a TGA instrument. The sample was thermally treated either in $N_2$ to 400° C. The thermal treatment involved the following two steps. Initially, the sample was heated to 250° C. at 10° C./min and held at that temperature for half an hour. Subsequently, the temperature of the sample was raised to 400° C. at 10° C./min and held at that temperature for two hours. After the thermal treatment, the thermoset was allowed to attain ambient temperature in the TGA instrument.

EXAMPLE 7

Reaction of $Co_2(CO)_8$ with 1 at a ratio of Co:1=1:5

A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 35 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of $Co_2(CO)_8$. Instead there were new carbonyl absorptions at 2097, 2062, and 2030 $cm^{-1}$ that had resulted from the species derived from $Co_2(CO)_8$ on reaction with 1. (In this case, the completion of the reaction is indicated by three new carbonyl absorptions at 2097, 2062, and 2030 $cm^{-1}$ and a remnant diacetylene absorption at 2070 $cm^{-1}$ in the product's IR. The intensity of the diacetylene absorption is 2-3 times more than that in the Co:1=1:1 reaction). The reaction was stopped at this point and the solvents were removed under vacuum with the flask placed in an oil bath at 80° C. Yield=99.9%.

EXAMPLE 8

Thermoset formation from the reaction product in Example 7

A 0.1 g portion of the reaction product from Example 7 was taken in a ceramic crucible and was placed in a TGA instrument. The sample was thermally treated as described in Example 6.

EXAMPLE 9

Reaction of $Co_2(CO)_8$ with 1 at a ratio of Co:1=3:1)

A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.5 g (1.099 mmol) of 1 was dissolved in 40 mL of hexane and the solution was cannulated into the former flask via cannula. After the addition, the solution was allowed to warm to room temperature when a reddish brown solution resulted. An IR spectrum of the aliquot was obtained after 30 min of stirring. The spectrum exhibited no carbonyl absorptions of $Co_2(CO)_8$. Instead there were new carbonyl absorptions at 2097, 2062, and 2030 $cm^{-1}$ that had resulted from the species derived from $Co_2(CO)_8$ on reaction with 1. (In this case, the completion of the reaction is indicated by three new carbonyl absorptions and remnant of $Co_2(CO)_8$ absorptions in the product's IR). The reaction was stopped at this point and the solvents were removed under vacuum with the flask placed in an oil bath at 80° C. Yield=99.9%.

EXAMPLE 10

Thermoset formation from the reaction product in Example 9

A 0.1 g portion of the reaction product from Example 9 was taken in a ceramic crucible and was placed in a TGA instrument. The sample was thermally treated as described in Example 6.

EXAMPLE 11

Reaction of $Co_2(CO)_8$ with 2 at a ratio of Co:2=1:1

Reagents 2 (0.198 g, 1.099 mmol) and $Co_2(CO)_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 2 was transferred to the flask containing the Co reagent solution using a cannula. The observations during the monitoring of the reaction (by FTIR spectroscopy) and the workup of the product were as in Example 5. Yield=99.5%.

EXAMPLE 12

Thermoset formation from the reaction product in Example 11

A 0.1 g portion of the reaction product from Example 11 was taken in a ceramic crucible and was placed in a TGA instrument. The sample was thermally treated as described in Example 6.

EXAMPLE 13

Reaction of $Co_2(CO)_8$ with 2 at a ratio of Co:2=1:5

A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.198 g (1.099 mmol) of 2 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 14

Thermoset formation from the reaction product in Example 13

A 0.1 g portion of the reaction product from Example 13 was taken in a ceramic crucible and was placed in a TGA instrument. The sample was thermally treated as described in Example 6.

EXAMPLE 15

Reaction of $Co_2(CO)_8$ with 2 at a ratio of Co:2=3:1

A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.198 g (1.099 mmol) of 2 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 9. Yield=99.5%.

EXAMPLE 16

Thermoset formation from the reaction product in Example 15

A 0.1 g portion of the reaction product from Example 15 was taken in a ceramic crucible and was placed in a TGA instrument. The sample was thermally treated as described in Example 6.

EXAMPLE 17

Reaction of $Co_2(CO)_8$ with 3 at a ratio of Co:3=1:1

Reagents 3 (0.842 g, 1.099 mmol) and $Co_2(CO)_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 3 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 18

Thermoset formation from the reaction product in Example 17

A 0.1 g portion of the reaction product from Example 17 was taken in a ceramic crucible and was placed in a TGA instrument. The sample was thermally treated as described in Example 6.

EXAMPLE 19

Reaction of $Co_2(CO)_8$ with 3 at a ratio of Co:3=1:5

A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 20

Thermoset formation from the reaction product in Example 19

A 0.1 g portion of the reaction product from Example 19 was taken in a ceramic crucible and was placed in a TGA instrument. The sample was thermally treated as described in Example 6.

EXAMPLE 21

Reaction of $Co_2(CO)_8$ with 3 at a ratio of Co:3=3:1

A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.842 g (1.099 mmol) of 3 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 9. Yield=99.5%.

EXAMPLE 22

Thermoset formation from the reaction product in Example 21

A 0.1 g portion of the reaction product from Example 21 was taken in a ceramic crucible and was placed in a TGA instrument. The sample was thermally treated as described in Example 6.

EXAMPLE 23

Reaction of $Co_2(CO)_8$ with 4 at a ratio of Co:4=1:1

Reagents 4 (0.545 g, 1.099 mmol) and $Co_2(CO)_8$ (0.365 g, 1.099 mmol) were taken in separate flame dried Schlenk flasks under argon. The reagents were dissolved in the nonpolar solvent hexane and cooled to −78° C. in dry ice/isopropanol bath. Subsequently, the solution of 4 was transferred to the flask containing the Co reagent solution using a cannula. After the addition, the solution was warmed to room temperature. The observations during the monitoring of the reaction (by FTIR spectroscopy) and the workup of the product were as in Example 5. Yield=99.5%.

EXAMPLE 24

Thermoset formation from the reaction product in Example 23

A 0.1 g portion of the reaction product from Example 23 was taken in a ceramic crucible and was placed in a TGA instrument. The sample was thermally treated as described in Example 6.

EXAMPLE 25

Reaction of $Co_2(CO)_8$ with 4 at a ratio of Co:4=1:5

A Schlenk flask, flame-dried under vacuum, was charged with 0.073 g (0.220 mmol) of $Co_2(CO)_8$ and 15 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 35 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 7. Yield=99.5%.

EXAMPLE 26

Thermoset formation from the reaction product in Example 25

A 0.1 g portion of the reaction product from Example 25 was taken in a ceramic crucible and was placed in a TGA instrument. The sample was thermally treated as described in Example 6.

EXAMPLE 27

Reaction of $Co_2(CO)_8$ with 4 at a ratio of Co:4=3:1

A Schlenk flask, flame-dried under vacuum, was charged with 1.095 g (3.297 mmol) of $Co_2(CO)_8$ and 25 mL of hexane was syringed into it under argon to produce a solution of the Co reactant. The solution was cooled to −78° C. in dry ice/isopropanol bath. In another flame-dried Schlenk flask 0.545 g (1.099 mmol) of 4 was dissolved in 40 mL of hexane and the solution was cannulated into the former flask via cannula. After the addition, the solution was allowed to warm to room temperature when a reddish brown solution resulted. The observations during the monitoring of the reaction (by FTIR spectroscopy) and the workup of the product were as in Example 9. Yield=99.5%.

EXAMPLE 28

Thermoset formation from the reaction product in Example 27

A 0.1 g portion of the reaction product from Example 27 was taken in a ceramic crucible and was placed in a TGA instrument. The sample was thermally treated as described in Example 6.

EXAMPLE 29

Reaction of $Cp_2Mo_2(CO)_6$ with 1 at a ratio of Mo:1=1:1

A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.269 g; 0.5495 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case, the completion of the reaction was indicated by four new carbonyl absorptions at 1950, 1923, 1900, and 1891 $cm^{-1}$ and a remnant diacetylene absorption at 2070 $cm^{-1}$ in the product's IR). The solvents were then removed under vacuum at 80° C. to leave behind a wine-red product. Yield=99.9%. Spectroscopic data: $^1$H NMR (300 MHz, $CDCl_3$): δ 5.68 (s, $C_5H_5$, PR), 5.32 (s, $C_5H_5$, CR), 3.5-1.5 (br, —$CB_{10}H_{10}C$—), 0.30, 0.26, 0.20, 0.11 and 0.09 (s, —$Si(CH_3)_2$—). $^{13}$C NMR (75 MHz, $CDCl_3$): δ 241.5 (CO) (CR), 234.1 (CO) (CR), 229.8 (CO) (CR), 226.5 (CO) (PR), 223.9 (CO)(PR); 132.46 (C4), 130.86 (C8), 128.79 (C5), 111.22 (C3), 95.72 ($C_5H_5$, PR), 92.29 (C6 and C7), 91.99 ($C_5H_5$, CR), 87.04 (C2), 84.85 (C1), 68.46, 68.14, 68.06 and 68.00 ($CB_{10}H_{10}C$), 1.80, 1.00, 0.47 and 0.28 (—$Si(CH_3)_2$—). IR (NaCl): $3113.76_{(vC—H)}(C_5H_5)$, $2962.07_{(vC—H)}$, $2598.78_{(vB—H)}$, $2070.44_{(vC—C)}$ (diacetylene), $1951.67_{(vC—O)}$, $1922.76_{(vC—O)}$, $1901.02_{(vC—O)}$, $1888.34_{(vC—O)}$, $1421.12_{(vC—C)}$, $1257.45_{(vSi—C)}$, $1081.80_{(vSi—O—Si)}$, $822.31_{(vSi—C)}$, $798.36_{(vSi—C)}$, 586.78, 554.84, 502.94.

EXAMPLE 30

Thermoset formation from the reaction product in Example 29

A 0.1 g portion of the reaction product from Example 29 was taken in a ceramic crucible and was placed in a TGA instrument. The sample was thermally treated as described in Example 6.

EXAMPLE 31

Reaction of $Cp_2Mo_2(CO)_6$ with 1 at a ratio of Mo:1=1:5

A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.0538 g; 0.1099 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case, the completion of the reaction was indicated by four new carbonyl absorptions at 1950, 1923, 1900, and 1891 $cm^{-1}$ and a remnant diacetylene absorption at 2070 $cm^{-1}$ in the product's IR. The intensity of the diacetylene absorption was 2-3 times more than that in the Mo:1=1:1 reaction). The solvents were then removed under vacuum at 80° C. to leave behind a wine-red product. Yield=99.9%.

EXAMPLE 32

Thermoset formation from the reaction product in Example 31

A 0.1 g portion of the reaction product from Example 31 was taken in a ceramic crucible and was placed in a TGA instrument. The sample was thermally treated as described in Example 6.

EXAMPLE 33

Reaction of $Cp_2Mo_2(CO)_6$ with 1 at a ratio of Mo:1=3:1

A Schlenk flask, flame-dried under vacuum, was charged with 0.25 g (0.5495 mmol) of 1 and 5 mL of THF, which was syringed into it under argon. In another flame-dried Schlenk flask $Cp_2Mo_2(CO)_6$ (0.807 g; 1.649 mmol) was dissolved in 5 mL of THF under argon and the solution was cannulated into the former flask. The solution at this point had a blood-red appearance. The mixture was refluxed in an oil bath for 15 h. The reaction was monitored by the periodic investigation of the reaction mixture by FTIR spectroscopy. It was allowed to proceed until the disappearance of the carbonyl absorptions of $Cp_2Mo_2(CO)_6$ (absorptions for $Cp_2Mo_2(CO)_6$ are 1960 and 1915 $cm^{-1}$) was achieved. (In this case, the completion of the reaction was indicated by four new carbonyl absorptions of the product and remnant of $Cp_2Mo_2(CO)_6$ absorptions in the product's IR). The solvents were then removed under vacuum at 80° C. to leave behind a wine-red product. Yield=99.9%.

EXAMPLE 34

Thermoset formation from the reaction product in Example 33

A 0.1 g portion of the reaction product from Example 33 was taken in a ceramic crucible and was placed in a TGA instrument. The sample was thermally treated as described in Example 6.

EXAMPLE 35

Reaction of $Ru_3(CO)_{12}$ with 1 at a ratio of Ru:1=1:1

Reagents 1 (0.5 g, 1.099 mmol) and $Ru_3(CO)_{12}$ (0.704 g, 1.099 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. It was allowed to proceed until the disappearance of the carbonyl absorptions of $Ru_3(CO)_{12}$ (absorptions for $Ru_3(CO)_{12}$ are 2052, 2017, 1994, and 1982 $cm^{-1}$) was achieved. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR). The product (yield=99.5%) was collected by removing hexane under vacuum with the flask placed in an oil bath at 80° C. Yield=99.9%.

EXAMPLE 36

Thermoset formation from the reaction product in Example 35

A 0.1 g portion of the reaction product from Example 35 was taken in a ceramic crucible and was placed in a TGA instrument. The sample was thermally treated as described in Example 6.

EXAMPLE 37

Reaction of $Ru_3(CO)_{12}$ with 1 at a ratio of Ru:1=1:5

Reagents 1 (0.5 g, 1.099 mmol) and $Ru_3(CO)_{12}$ (0.422 g, 0.219 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 $cm^{-1}$ and a remnant diacetylene absorption at 2070 $cm^{-1}$ in the product's IR. The intensity of the diacetylene absorption was 2-3 times more than that in the Ru:1=1:1 reaction). The product (yield=99.5%) was collected by removing hexane under vacuum with the flask placed in an oil bath at 80° C. Yield=99.9%.

EXAMPLE 38

Thermoset formation from the reaction product in Example 37

A 0.1 g portion of the reaction product from Example 37 was taken in a ceramic crucible and was placed in a TGA instrument. The sample was thermally treated as described in Example 6.

EXAMPLE 39

Reaction of $Ru_3(CO)_{12}$ with 1 at a ratio of Ru:1=3:1

Reagents 1 (0.5 g, 1.099 mmol) and $Ru_3(CO)_{12}$ (2.112 g, 3.297 mmol) were taken in separate flame dried Schlenk flasks under argon. The reagents were dissolved in ethanol. Subsequently, the solution of 1 was transferred to the flask containing the Ru reagent solution using a cannula. The solution was refluxed for 24 h. The reaction was monitored by the periodic investigation of the reaction mixture by FTIR spectroscopy. (In this case, the completion of the reaction was indicated by four new carbonyl absorptions at 2081, 2061, 2023, and 1961 $cm^{-1}$ and remnant of $Ru_3(CO)_{12}$ absorptions in the product's IR). The product (yield=99.5%) was collected by removing hexane under vacuum with the flask placed in an oil bath at 80° C. Yield=99.9%.

EXAMPLE 40

Thermoset formation from the reaction product in Example 39

A 0.1 g portion of the reaction product from Example 39 was taken in a ceramic crucible and was placed in a TGA instrument. The sample was thermally treated as described in Example 6.

EXAMPLE 41

Reaction of $Co_2(CO)_8$ and $Fe(CO)_5$ with 1 at a ratio of (Co+Fe):1=1:1

Reagents 1 (0.5 g, 1.099 mmol) and a mixture of $Co_2(CO)_8$ (0.183 g, 0.5495 mmol) and $Fe(CO)_5$ (0.108 g, 0.5495 mmol) were taken in separate flame dried Schlenk flasks under argon. The reagents were dissolved in the non-polar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. It was allowed to proceed until the disappearance of the carbonyl absorptions of $Co_2(CO)_8$ and $Fe(CO)_5$ (absorptions for $Co_2(CO)_8$ are 2022, 1847, and 1828 $cm^{-1}$; for $Fe(CO)_5$ are 2013 and 2005 $cm^{-1}$) was achieved. (In this case, the completion of the reaction was indicated by new carbonyl absorptions at 2097, 2062, 2030, 1815, 1735, and 1695 $cm^{-1}$ and a remnant diacetylene absorption at 2070 $cm^{-1}$ in the product's IR). The product (yield=99.5%) was collected by removing hexane under vacuum with the flask placed in an oil bath at 80° C. Yield=99.9%.

EXAMPLE 42

Thermoset formation from the reaction product in Example 41

A 0.1 g portion of the reaction product from Example 41 was taken in a ceramic crucible and was placed in a TGA instrument. The sample was thermally treated as described in Example 6.

EXAMPLE 43

Reaction of $Co_2(CO)_8$ and $Fe(CO)_5$ with 1 at a ratio of (Co+Fe):1=1:5

Reagents 1 (0.5 g, 1.099 mmol) and a mixture of $Co_2(CO)_8$ (0.037 g, 0.1099 mmol) and $Fe(CO)_5$ (0.022 g, 0.1099 mmol) were taken in separate flame dried Schlenk flasks under argon. The reagents were dissolved in the non-polar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 $cm^{-1}$ and a remnant diacetylene absorption at 2070 $cm^{-1}$ in the product's IR. The intensity of the diacetylene absorption was 2-3 times more than that in the Co+Fe:1=1:1 reaction)). The product (yield=99.5%) was collected by removing hexane under vacuum with the flask placed in an oil bath at 80° C. Yield=99.9%.

EXAMPLE 44

Thermoset formation from the reaction product in Example 43

A 0.1 g portion of the reaction product from Example 43 was taken in a ceramic crucible and was placed in a TGA instrument. The sample was thermally treated as described in Example 6.

EXAMPLE 45

Reaction of $Co_2(CO)_8$ and $Fe(CO)_5$ with 1 at a ratio of (Co+Fe):1=3:1

Reagents 1 (0.5 g, 1.099 mmol) and a mixture of $Co_2(CO)_8$ (0.549 g, 1.649 mmol) and $Fe(CO)_5$ (0.324 g, 1.649 mmol) were taken in separate flame dried Schlenk flasks under argon. The reagents were dissolved in the non-polar solvent hexane and cooled to −78° C. in dry ice/isopropanol bath. Subsequently, the solution of 1 was transferred to the flask containing the Co reagent solution using a cannula. After the addition, the solution was warmed to room temperature. The reaction was monitored by the periodic investigation of the reaction mixture by FTIR spectroscopy. (In this case, the completion of the reaction was indicated by new carbonyl absorptions at 2097, 2062, 2030, 1815, 1735, and 1695 $cm^{-1}$ and the remnant of $Co_2(CO)_8$ and $Fe(CO)_5$ absorptions in the product's IR). The product (yield=99.5%) was collected by removing hexane under vacuum with the flask placed in an oil bath at 80° C. Yield=99.9%.

EXAMPLE 46

Thermoset formation from the reaction product in Example 45

A 0.1 g portion of the reaction product from Example 45 was taken in a ceramic crucible and was placed in a TGA instrument. The sample was thermally treated as described in Example 6.

EXAMPLE 47

Reaction of (hfac)Cu(COD) with 1 at a ratio of Cu:1=1:1

Reagents 1 (0.5 g, 1.099 mmol) and (hfac)Cu(COD) (0.416 g, 1.099 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 $cm^{-1}$ was observed in the product's IR. The product (yield=99.5%) was collected by removing hexane under vacuum with the flask placed in an oil bath at 80° C. Yield=99.9%.

EXAMPLE 48

Thermoset formation from the reaction product in Example 47

A 0.1 g portion of the reaction product from Example 47 was taken in a ceramic crucible and was placed in a TGA instrument. The sample was thermally treated as described in Example 6.

EXAMPLE 49

Reaction of (hfac)Cu(COD) with 1 at a ratio of Cu:1=1:5

Reagents 1 (0.5 g, 1.099 mmol) and (hfac)Cu(COD) (0.083 g, 0.219 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The remnant diacetylene absorption at 2070 $cm^{-1}$ (about 2-3 times more intense than in Example 47) was observed in the product's IR. The product (yield=99.5%) was collected by removing hexane under vacuum with the flask placed in an oil bath at 80° C. Yield=99.9%.

EXAMPLE 50

Thermoset formation from the reaction product in Example 49

A 0.1 g portion of the reaction product from Example 49 was taken in a ceramic crucible and was placed in a TGA instrument. The sample was thermally treated as described in Example 6.

EXAMPLE 51

Reaction of (hfac)Cu(COD) with 1 at a ratio of Cu:1=3:1

Reagents 1 (0.5 g, 1.099 mmol) and (hfac)Cu(COD) (1.248 g, 3.297 mmol) were taken in separate flame dried Schlenk flasks under argon. The reagents were dissolved in THF. Subsequently, the solution of 1 was transferred to the flask containing the Cu reagent solution using a cannula. The mixture was stirred at room temperature for 5 h. The product (yield=99.5%) was collected by removing hexane under vacuum with the flask placed in an oil bath at 80° C. Yield=99.9%.

EXAMPLE 52

Thermoset formation from the reaction product in Example 51

A 0.1 g portion of the reaction product from Example 51 was taken in a ceramic crucible and was placed in a TGA instrument. The sample was thermally treated as described in Example 6.

EXAMPLE 53

Physical mixing of $MgCl_2$ with 1 at a ratio of Mg:1=1:1

Reagents 1 (0.5 g, 1.099 mmol) and $MgCl_2$ (0.105 g, 1.099 mmol) were physically ground together in a ceramic mortar using a pestle. A pasty mixture was obtained. Yield=100%.

EXAMPLE 54

Thermoset formation from the composition in Example 53

A 0.1 g portion of the addition product from Example 53 was taken in a ceramic crucible and was placed in a TGA instrument. The sample was thermally treated as described in Example 6.

EXAMPLE 55

Physical mixing of $SmCl_2$ with 1 at a ratio of Sm:1=1:1

Reagents 1 (0.5 g, 1.099 mmol) and $SmCl_2$ (0.243 g, 1.099 mmol) were physically ground together in a ceramic mortar using a pestle. A pasty mixture was obtained. Yield=100%.

EXAMPLE 56

Thermoset formation from the composition in Example 55

A 0.1 g portion of the addition product from Example 55 was taken in a ceramic crucible and was placed in a TGA instrument. The sample was thermally treated as described in Example 6.

EXAMPLE 57

Physical mixing of $SmCl_2$ and $Co_2(CO)_8$ with 1 at a ratio of (Sm+Co):1=1:1

Reagents 1 (0.5 g, 1.099 mmol), $SmCl_2$ (0.122 g, 0.550 mmol) and $Co_2(CO)_8$ (0.188 g, 0.550 mmol) were physically ground together in a ceramic mortar using a pestle. A pasty mixture was obtained. Yield=100%.

EXAMPLE 58

Thermoset formation from the composition in Example 57

A 0.1 g portion of the addition product from Example 57 was taken in a ceramic crucible and was placed in a TGA instrument. The sample was thermally treated as described in Example 6.

EXAMPLE 59

Physical mixing of $AlCl_2$ with 1 at a ratio of Al:1=1:1

Reagents 1 (0.5 g, 1.099 mmol) and $AlCl_2$ (0.147 g, 1.099 mmol) were physically ground together in a ceramic mortar using a pestle. A pasty mixture was obtained. Yield=100%.

EXAMPLE 60

Thermoset formation from the composition in Example 59

A 0.1 g portion of the addition product from Example 59 was taken in a ceramic crucible and was placed in a TGA instrument. The sample was thermally treated as described in Example 6.

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A metallized thermoset comprising:
   a crosslinked metallized polymer comprising a backbone comprising:
     an acetylenic repeat unit, at least one of the acetylenic repeat units comprising a $(ML_x)_y$-acetylene complex;
     wherein each M is an independently selected metal;
     wherein each L is an independently selected ligand; and
     wherein x and y are positive integers; and
   one or more repeat units selected from $—SiR_2—(O—SiR_2)_n—$ and $—SiR_2—(O—SiR_2)_n-[Cb-SiR_2—(O—SiR_2)_n]_m—$;
     wherein each R is an independently selected organic group;
     wherein each Cb is an independently selected carborane; and
     wherein each n is an independently selected integer greater than or equal to one; and
     wherein each m is an independently selected integer greater than or equal to zero;
   wherein the metallized thermoset comprises one or more of a crosslink between acetylene groups and a polycarbosiloxane crosslink.

2. The metallized thermoset of claim 1, wherein each acetylenic repeat unit consists of two groups independently selected from acetylene and $(ML_x)_y$-acetylene complex.

3. The metallized thermoset of claim 1, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

4. The metallized thermoset of claim 1, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

5. The metallized thermoset of claim 1, wherein each Cb is $—CB_{10}H_{10}C—$.

6. The metallized thermoset of claim 1, wherein each R is methyl.

7. The metallized thermoset of claim 1, wherein the backbone further comprises:
   one or more metallic repeat units selected from metallocenylene, -M'Cp$_2$-, and -M'L'$_z$-;
     wherein each M' is a metal;
     wherein Cp is cyclopentadienyl;
     wherein each L' is an independently selected ligand; and
     wherein each z is an integer from 2 to 6.

8. The metallized thermoset of claim 7, wherein each metallocenylene is ferrocenylene.

9. The metallized thermoset of claim 7, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

10. The metallized thermoset of claim 7, wherein each L' is independently selected from amino, nethylene, and cyclooctadiene.

11. The metallized thermoset of claim 1, wherein the backbone comprises the formula:

wherein Q is the acetylenic repeat unit;
wherein Y is a metallic repeat unit selected from metallocenylene, -M'Cp$_2$-, and -M'L'$_z$-;
  wherein each M' is a metal;
  wherein Cp is cyclopentadienyl;
  wherein each L' is an independently selected ligand; and
  wherein each z is an integer from 2 to 6;
wherein each p is an integer greater than or equal to zero.

12. The metallized thermoset of claim 11, wherein n, m, and p are, as a group, selected from:
   n is 1, m is 1, and p is zero;
   n is 1, m is zero, and p is zero;
   n is 1, m is 1, and p is 1; and
   n is 1, m is zero, and p is 1.

13. A composition comprising:
   the metallized thermoset of claim 1; and
   one or more metallic components dispersed homogeneously throughout the composition, the metallic component selected from free metal atoms, metal clusters, metal nanoparticles, organometallic compounds, organometallic units, and metal salts.

14. A composition comprising:
   the metallized thermoset of claim 1; and
   a siloxane thermoset comprising a backbone comprising:
     an acetylenic repeat unit; and
     one or more repeat units selected from $—SiR_2—(O—SiR_2)_n—$ and $—SiR_2—(O—SiR_2)_n-[Cb-SiR_2—(O—SiR_2)_n]_m—$;

wherein the siloxane thermoset comprises one or more of crosslinks between acetylene groups and polycarbosiloxane crosslinks.

15. The composition of claim 14, further comprising:
one or more metallic components dispersed homogeneously throughout the composition, the metallic component selected from free metal atoms, metal clusters, metal nanoparticles, organometallic compounds, organometallic units, and metal salts.

16. The metallized thermoset of claim 1, wherein the backbone comprises the formula:

wherein Q is the acetylenic repeat unit.

17. The metallized thermoset of claim 1, wherein the backbone consists of the formula:

wherein Q is the acetylenic repeat unit.

18. A composition comprising:
a siloxane thermoset made by crosslinking a linear polymer comprising a backbone comprising:
  an acetylene group; and
  one or more repeat units selected from —$SiR_2$—(O—$SiR_2)_n$— and —$SiR_2$—(O—$SiR_2)_n$-[Cb-$SiR_2$—O—$SiR_2)_n]_m$—;
  wherein each R is an independently selected organic group;
  wherein each Cb is an independently selected carborane; and
  wherein each n is an independently selected integer greater than or equal to one; and
  wherein each m is an independently selected integer greater than or equal to zero;
  wherein the siloxane thermoset comprises one or more of crosslinks between acetylene groups and polycarbosiloxane crosslinks; and
a metallic compound capable of reacting with the acetylene group to form a $(ML_x)_y$-acetylene complex;
  wherein each M is an independently selected metal;
  wherein each L is an independently selected ligand; and
  wherein x and y are positive integers.

19. The composition of claim 18, wherein the metallic compound is one or more of $V(CO)_6$, $Cr(CO)_6$, $Mo(CO)_6$, $W(CO)_6$, $Mn_2(CO)_{10}$, $Tc_2(CO)_{10}$, $Re_2(CO)_{10}$, $Fe(CO)_5$, $Fe_2(CO)_9$, $Fe_3(CO)_{12}$, $Ru(CO)_5$, $Ru_3(CO)12$, $Os(CO)_5$, $Os_3(CO)_{12}$, $Co_2(CO)_8$, $Co_3(CO)_{12}$, $Co_6(CO)_{16}$, $Rh_4(CO)_{12}$, $Rh_6(CO)_{16}$, $Ir_4(CO)_{12}$, $Ir_6(CO)_{16}$, $Ni(CO)_4$, $Cp(CH_3)Re(CO)_3$, $Cp(CH_3)_5Re(CO)_3$, $[Cp(CH_3)_5]_2Cr_2(CO)_4$, $Cp_2Fe_2(CO)_4$, $C_6H_8Fe(CO)_3$, $C_6H_8Fe(CO)_3$, $C_8H_8Fe(CO)_3$, CpCr$(CO)_3$, $Cp_2Mo(CO)_6$, $C_7H_8Mo(CO)_3$, $CpMn(CO)_3$, $Cp(Si(CH_3)_3)Mn(CO)_3$, $Cp(CH_3)_5Rh(CO)_2$, $Cp_2Ru_2(CO)_4$, (hexafluroacetylacetonate)Cu(cyclooctadiene), Cr(hexafluroacetylacetonate), Co(acetylacetonate) $(CH_3CN)_4$ Cu(hexafluroacetylacetonate), $(CH_3)_2Au$(acetylacetonate), (cyclooctadiene)Ir(acetylacetonate), Fe(acetylacetonate), Mn(acetylacetonate), $MoO_2$(acetylacetonate)$_2$, Ni(hexafluroacetylacetonate), Ni(cyclooctadiene)$_2$, Ni(SCN)$_2$, $PdCl_2(CH_3CN)_2$, $Pd(NH_3)_2(NO_2)_2$, $Pt(NH_3)_2Cl_2$, Rh(cyclooctadiene)$_2$(SO$_3$CF$_3$), Rh(cyclooctadiene)Cl$_2$, Zr(trifluoroacetylacetonate), $MgCl_2$, $SmCl_2$, and $AlCl_2$.

20. A method of making a metallized composition comprising:
providing the composition of claim 18; and
heating the composition to form at least one $(ML_x)_y$-acetylene complex.

21. The composition of claim 18, wherein the backbone comprises the formula:

wherein Q is the acetylenic repeat unit.

22. The composition of claim 18, wherein the backbone consists of the formula:

wherein Q is the acetylenic repeat unit.

23. A composition comprising:
a siloxane thermoset made by crosslinking a linear polymer comprising a backbone comprising:
  an acetylene group; and
  one or more repeat units selected from —$SiR_2$—(O—$SiR_2)_n$— and —$SiR_2$—(O—$SiR_2)_n$-[Cb-$SiR_2$—(O—$SiR_2)_n]_m$—;
  wherein each R is an independently selected organic group;
  wherein each Cb is an independently selected carborane; and
  wherein each n is an independently selected integer greater than or equal to one; and
  wherein each m is an independently selected integer greater than or equal to zero;
  wherein the siloxane thermoset comprises one or more of crosslinks between acetylene groups and polycarbosiloxane crosslinks; and
one or more metallic components dispersed homogeneously throughout the composition, the metallic component selected from metal salts and metallic compounds capable of reacting with the acetylene group to form a $(ML_x)_y$-acetylene complex;
  wherein each M is an independently selected metal;
  wherein each L is an independently selected ligand; and
  wherein x and y are positive integers.

24. The composition of claim 23, wherein the backbone comprises the formula:

wherein Q is the acetylenic repeat unit.

25. The composition of claim 23, wherein the backbone consists of the formula:

wherein Q is the acetylenic repeat unit.

26. A method of making a metallized thermoset comprising:
providing a metallized polymer comprising a backbone comprising:
an acetylenic repeat unit, at least one of the acetylenic repeat units comprising a $(ML_x)_y$-acetylene complex;
wherein each M is an independently selected metal;
wherein each L is an independently selected ligand; and
wherein x and y are positive integers; and
one or more repeat units selected from —$SiR_2$—(O—$SiR_2$)$_n$— and —$SiR_2$—(O—$SiR_2$)$_n$-[Cb-$SiR_2$—(O—$SiR_2$)$_n$]$_m$—;
wherein each R is an independently selected organic group;
wherein each Cb is an independently selected carborane; and
wherein each n is an independently selected integer greater than or equal to one; and
wherein and each m is an independently selected integer greater than or equal to zero; and
heating the metallized polymer to form one or more crosslinks selected from a crosslink between acetylene groups and polycarbosiloxane crosslink.

27. The method of claim 26, wherein each acetylenic repeat unit consists of two groups independently selected from acetylene and $(ML_x)_y$-acetylene complex.

28. The method of claim 26, wherein each M is independently selected from main group metals, transition metals, lanthanides, actinides, cobalt, molybdenum, ruthenium, iron, copper, vanadium, chromium, tungsten, manganese, technetium, rhenium, osmium, rhodium, iridium, nickel, gold, palladium, platinum, zirconium, magnesium, samarium, and aluminum.

29. The method of claim 26, wherein each L is independently selected from carbonyl, cyclopentadienyl, pentamethylcyclopentadienyl, trimethylsilylcyclopentadienyl, hexafluroacetylacetonate, cyclooctadiene, acetylacetonate, methyl cyanide, methyl, oxide, thiocyanide, chloride, amino, nitro, trifluoromethylsulfide, trifluoroacetylacetonate, cyano, cyanide, and isocyanide.

30. The method of claim 26, wherein each Cb is —$CB_{10}H_{10}C$—.

31. The method of claim 26, wherein each R is methyl.

32. The method of claim 26, wherein the backbone further comprises:
one or more metallic repeat units selected from metallocenylene, ferrocenylene, -M'Cp$_2$-, and -M'L'$_z$-;
wherein each M' is a metal;
wherein Cp is cyclopentadienyl;
wherein each L' is an independently selected ligand; and
wherein each z is an integer from 2 to 6.

33. The method of claim 32, wherein each M' is independently selected from main group metals, transition metals, lanthanides, actinides, iron, ruthenium, osmium, molybdenum, zirconium, vanadium, tungsten, titanium, platinum, nickel, rhodium, and palladium.

34. The method of claim 32, wherein each L' is independently selected from amino, ethylene, and cyclooctadiene.

35. The method of claim 26, wherein the backbone comprises the formula:

wherein Q is the acetylenic repeat unit;
wherein Y is a metallic repeat unit selected from metallocenylene, -M'Cp$_2$-, and -M'L'$_z$-;
wherein each M' is a metal;
wherein Cp is cyclopentadienyl;
wherein each L' is an independently selected ligand; and
wherein each z is an integer from 2 to 6;
wherein each p is an integer greater than or equal to zero.

36. The method of claim 35, wherein n, m, and p are, as a group, selected from:

n is 1, m is 1, and p is zero;
n is 1, m is zero, and p is zero;
n is 1, m is 1, and p is 1; and
n is 1, m is zero, and p is 1.

37. The method of claim 26, wherein the backbone comprises the formula:

wherein Q is the acetylenic repeat unit.

38. The method of claim 26, wherein the backbone consists of the formula:

wherein Q is the acetylenic repeat unit.

* * * * *